(No Model.) 3 Sheets—Sheet 1.

W. H. ECKERT, J. A. SEELY & E. A. ECKERT.
ELECTRIC CABLE.

No. 313,305. Patented Mar. 3, 1885.

WITNESSES
Wm A. Skinkle,
H. W. Elmore.

INVENTORS
Wm. H. Eckert
John A. Seely
Edward A. Eckert
By their Attorneys
Parkinson & Parkinson (No Model.) 3 Sheets—Sheet 2.
W. H. ECKERT, J. A. SEELY & E. A. ECKERT.
ELECTRIC CABLE.
No. 313,305. Patented Mar. 3, 1885.
Fig. 5,
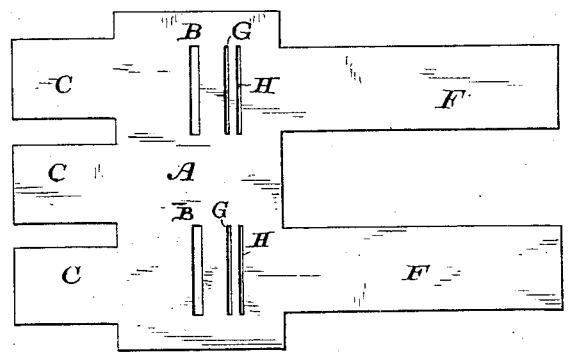
Fig. 6,
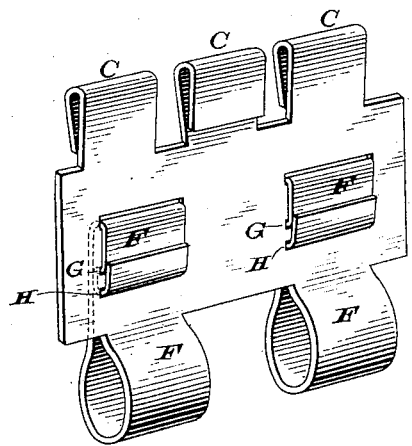
WITNESSES
Wm A. Skinkle
H. W. Elmore
INVENTORS
Wm H. Eckert
John A. Seely
Edward A. Eckert
By their Attorneys (No Model.) 3 Sheets—Sheet 3.
W. H. ECKERT, J. A. SEELY & E. A. ECKERT.
ELECTRIC CABLE.

No. 313,305. Patented Mar. 3, 1885.

WITNESSES
Wm A. Skinkle
Harry King

INVENTORS.
William H. Eckert
John A. Seely
Edward A. Eckert
By their Attorneys,

UNITED STATES PATENT OFFICE.

WILLIAM H. ECKERT, JOHN A. SEELY, AND EDWARD A. ECKERT, OF CINCINNATI, OHIO, ASSIGNORS TO THE AMERICAN BELL TELEPHONE COMPANY, OF BOSTON, MASSACHUSETTS.

ELECTRIC CABLE.

SPECIFICATION forming part of Letters Patent No. 313,305, dated March 3, 1885.

Application filed January 28, 1881. (No model.)

*To all whom it may concern:*

Be it known that we, WILLIAM H. ECKERT, JOHN A. SEELY, and EDWARD A. ECKERT, all of the city of Cincinnati, county of Hamilton, and State of Ohio, have jointly invented a certain new and useful Improvement in Electric Cables, of which the following is a specification.

The main object of our invention is to provide a convenient means for making ground-connections for the induction core or wire of aerial cables used for telegraphic or telephonic purposes. For such cables it is necessary to connect the induction-core with the ground at frequent and approximately regular intervals. Such connections, if made directly with the earth, as heretofore, require much wire, involve trouble and expense in placing them, and unduly trammel the cable, preventing its swaying with proper freedom. Moreover, in cities, where the cable is often carried over the tops of buildings, direct ground-connections cannot be made at even approximately regular intervals.

By the present invention we dispense with the direct earth-wires by connecting the induction-core of the cable at regular intervals with the supporting rod or wire, the latter being grounded at each end. Preferably the connection between the induction-core and supporting-wire is made by the cable-hangers, which to that end are made of good conducting material. We have described herein a cable-hanger of our invention, which will be found specially advantageous for supporting the cable, and connecting its induction-core with the supporting rod or wire.

Figure 1:
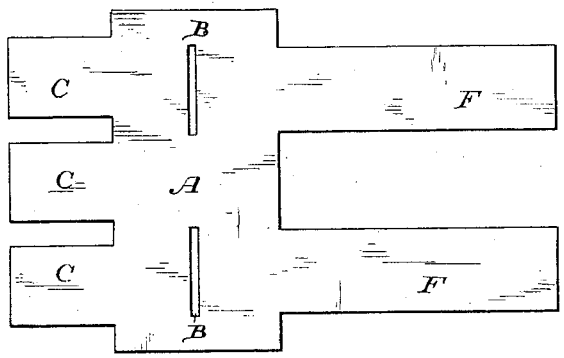
Figure 2:
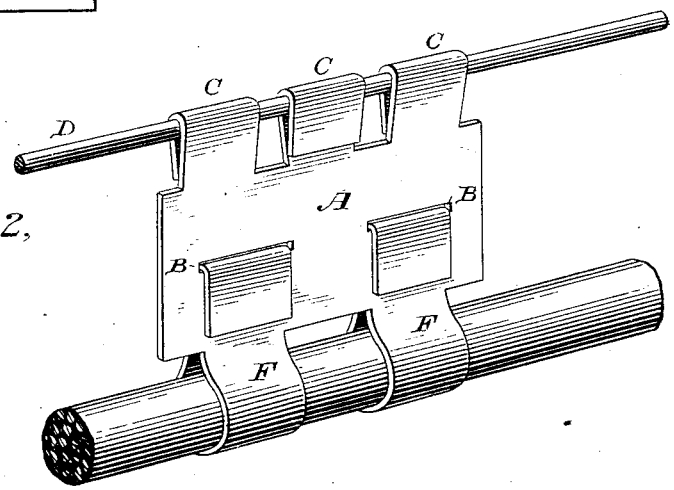
Figure 3:
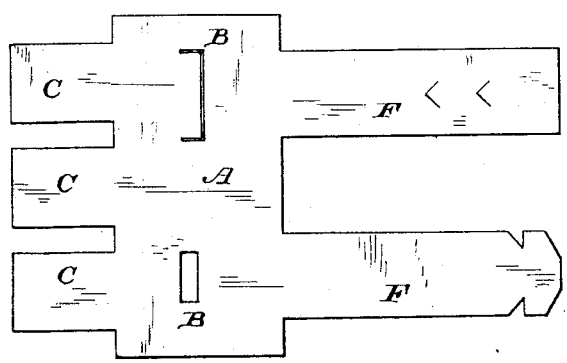
Figure 4:
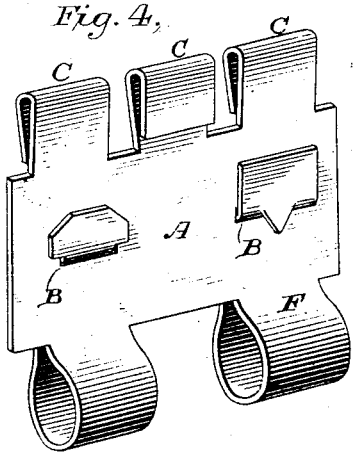
Figure 7:
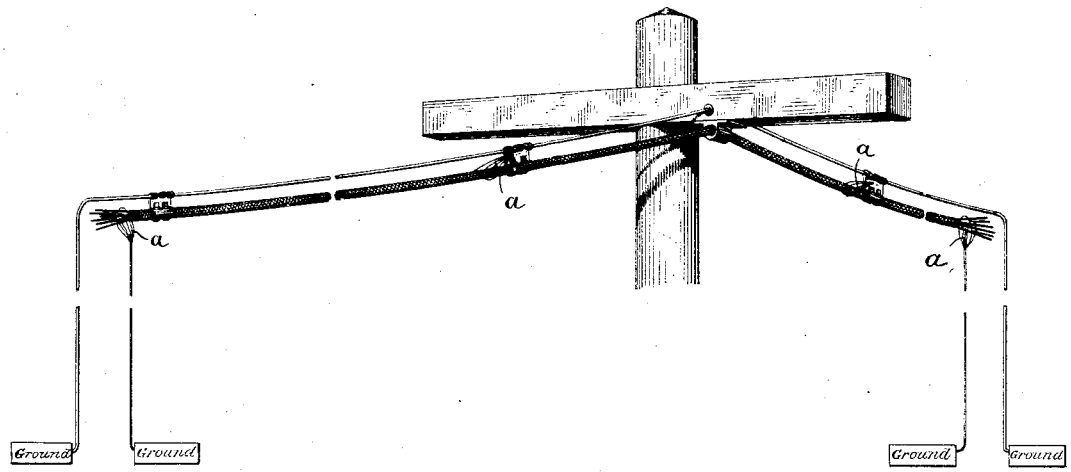
Figure 8:
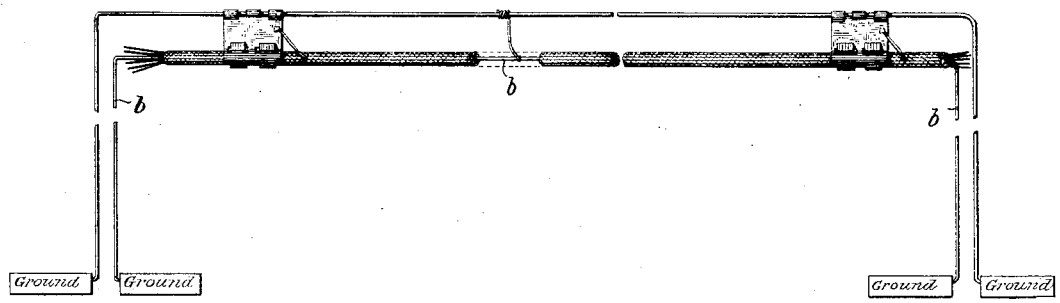

Figure 1 of the accompanying drawings is a plan of the blank of a simple form of our hanger. Fig. 2 shows the same hanger as applied to the support of a cable. Figs. 3 and 5 represent blanks provided with locking devices—such as prongs or lips, T-heads or additional slots—for the purpose of securing their arms or straps more firmly in the position to which they are bent; Figs. 4 and 6, the same blanks, respectively, when bent into final shape, and Figs. 7 and 8 indicate alternative methods of making the connection between supporting and induction wires.

The blank A is made from a thin plate of galvanized iron or other pliable material, preferably such as affords a good electrical conductor, and is capable of being cut with its several slots by a single stroke of a die. It consists, substantially, of a body portion having slots B, arms C, hereinafter termed "supporting-arms," projecting one other side of the body part, and arms F, hereinafter styled "receiving" or "cable" arms, projecting from the other side of said body part, and adapted to be bent up and passed through the slots.

A rod or stout wire, D, is extended along the course over which the cable is to be stretched, and the cable attached to it at such intervals as may be desirable by bending the supporting-arms around this rod or wire and the receiving-arms around the cable, and then passing the last-mentioned arms through the slots in the body part. The several arms are held in position by the resistance of the material of which they are composed, aided, in case of the cable-arms, by the slots through which they are passed. To still further secure them, we provide, in our preferred form, additional slots through which the arms are passed and then bent sharply backward, as shown in Fig. 6; or prongs or T-heads may be used, as shown in Figs. 3 and 4. The middle supporting-arm is advisably bent in the opposite direction from the others, and thereby the hanger is effectively secured against any danger of being released from the supporting-wire by the swing of the cable.

In practice the blank should be just pliable enough to be readily bent into position by hand, while at the same time preserving sufficient resistance of the metal to retain the arms firmly in the position to which they are bent. This enables the attachment to be made very rapidly, and in such manner as to clasp the supporting-wire and cable snugly and firmly, not only precluding endwise slipping of the latter, but, by the extended support afforded, as well as by the secure grasp, preventing it from sagging or being cut, and yet permitting it to swing so freely that it may even be thrown entirely around the supporting-wire without danger of detachment.

As is well known to those practically familiar with the art, every cable is furnished with induction-wires, to carry off induced currents. These may consist of numerous fine small wires, $a$, one wrapped about each conductor, or may be reduced to a single enlarged wire, $b$, running centrally through the cable like a core. If the former are used, we tap the cable at as frequent intervals as may be desirable—say once in every seventy-five feet—and, severing said wires, lift their ends and solder or otherwise secure them, as in Fig. 7, to one of the hangers, which, together with the supporting-wire, are for the purpose made of good conducting material. If, on the other hand, the central core is put in service, the cable is likewise tapped at appropriate intervals, and one end raised from said core, and soldered or bound to the supporting-wire, as in Fig. 8, or it may be to a hanger. Now, the supporting-wire being made of proper relative size and conducting power, and grounded at each end, will serve, in respect to the induction wire or wires, all the purposes of a ground wherever connection is made between them, and such connections will obviously be made without any hinderance on the score of buildings or other obstacles to other direct earth-connections along the whole line of the cable. At the terminals the induction-wires themselves will or may be put direct to earth, as shown.

Above advantages can also be secured by connecting the induction-wire, by any suitable conductor other than the hanger, with the supporting-wire or other wire of sufficient electrical capacity, extending substantially parallel with the cable, and grounded as related of the supporting-wire.

Although the particular form of hanger herein described is novel, and its use is recommended in carrying out the invention, we do not claim such hanger herein, purposing, in compliance with the requirement of the Commissioner of Patents, to file a separate application therefor.

We claim as our invention—

1. In combination with a supporting-wire of conducting properties grounded at each end, a hanger, also of conducting material, in contact with the induction-wire of an electric cable, and serving both to support said cable and ground said induction-wire, substantially as described.

2. In combination with an electric cable, a rod or wire of conducting material, grounded at both ends, and connected at intervals with the induction-wire of said cable, serving both to support said cable and to furnish a ground for said induction-wire.

3. The combination, with an electric cable, of a wire of conducting material, extending substantially parallel therewith, grounded at both ends, and having at intervals electric connections with the induction-wire of said cable, for the purposes described.

4. The combination of an elastic cable, a series of pliable metallic hangers bent into position to snugly clasp the cable, and secured in permanent contact with the induction-wire thereof, and a supporting-wire of conducting material grounded at each end, said hangers embracing said supporting-wire at their upper ends, substantially as described.

WM. H. ECKERT.
JOHN A. SEELY.
EDWARD A. ECKERT.

Witnesses:
FRANK LEONARD,
DANL. KELLY.